United States Patent
Carter et al.

(10) Patent No.: US 8,522,232 B1
(45) Date of Patent: Aug. 27, 2013

(54) DECOUPLING SOFTWARE LOADS FOR CUSTOMER PREMISE EQUIPMENT

(75) Inventors: Wade Carter, Johns Creek, GA (US); Robert Allen Walston, Atlanta, GA (US); Keith Mendel, Alpharetta, GA (US)

(73) Assignee: Arris Enterprises, Inc., Suwanee, GA (US)

( * ) Notice: Subject to any disclaimer, the term of this patent is extended or adjusted under 35 U.S.C. 154(b) by 274 days.

(21) Appl. No.: 12/830,475

(22) Filed: Jul. 6, 2010

Related U.S. Application Data

(60) Provisional application No. 61/223,286, filed on Jul. 6, 2009.

(51) Int. Cl.
G06F 9/445 (2006.01)
G06F 9/44 (2006.01)

(52) U.S. Cl.
USPC .......................................... 717/173; 717/168

(58) Field of Classification Search
USPC ....................................................... 717/173
See application file for complete search history.

(56) References Cited

U.S. PATENT DOCUMENTS

| | | | | |
|---|---|---|---|---|
| 6,009,274 | A * | 12/1999 | Fletcher et al. | 717/173 |
| 7,305,460 | B2 * | 12/2007 | Park | 709/222 |
| 7,673,297 | B1 * | 3/2010 | Arsenault et al. | 717/168 |
| 8,064,479 | B2 * | 11/2011 | Assouline et al. | 370/466 |
| 8,074,212 | B2 * | 12/2011 | Li et al. | 717/168 |
| 2005/0034115 | A1 * | 2/2005 | Carter et al. | 717/173 |
| 2005/0125842 | A1 * | 6/2005 | Calmels et al. | 717/168 |
| 2009/0158383 | A1 * | 6/2009 | Taskiran-Cyr | 725/132 |
| 2009/0199250 | A1 * | 8/2009 | Assouline et al. | 725/96 |
| 2010/0122246 | A1 * | 5/2010 | Gesquiere et al. | 717/173 |
| 2010/0153943 | A1 * | 6/2010 | Chase | 717/173 |
| 2010/0262961 | A1 * | 10/2010 | Pak et al. | 717/173 |

FOREIGN PATENT DOCUMENTS

| | | |
|---|---|---|
| WO | WO 0145414 A2 * | 6/2001 |
| WO | WO 0248897 A1 * | 6/2002 |

OTHER PUBLICATIONS eDOCSIS Specification, CM-SP-eDOCSIS-I14-080215 [online], Feb. 15, 2008 [retrieved on Jun. 13, 2012]. Retrieved from the Internet: <URL: http://www.cablelabs.com/specifications/archives/CM-SP-eDOCSIS-I14-080215.pdf>. pp. 1, 11, and 19.*

Data-Over-Cable Service Interface Specifications DOCSIS 3.0: MAC and Upper Layer Protocols Interface Specification, CM-SP-MULPIv3.0-I09-090121 [online], Jan. 21, 2009 [retrieved on Jun. 13, 2012]. Retrieved from the Internet:<URL:http://cablelabs.com/specifications/archives/CM-SP-MULPIv3_0-I09-090121.pdf>. pp. 343-344 and 593-600.*

(Continued)

*Primary Examiner* — Thuy Dao
*Assistant Examiner* — Ravi K Sinha
(74) *Attorney, Agent, or Firm* — Troy A. Van Aacken

(57) ABSTRACT

Methods, systems, and apparatus can be used to decouple software loads on customer premise equipment devices. In various examples, simple network management protocol (SNMP) messages, configuration files or other types of notifications can be used to notify customer premise devices of software updates for non-data over cable service interface specification (DOCSIS) modules. The version of the software load included in a notification can be compared to existing software loads to determine whether the software load identified by the notification should be loaded to the device.

19 Claims, 5 Drawing Sheets

(56) References Cited

OTHER PUBLICATIONS

Bob Loveless and Ron Hranac, DOCSIS 3.0—The Upside and Downside of the Access Network, 2006 [online], [retrieved from the Internet] <http://www.scientificatlanta.com/products/customers/white-papers/g1662a-docsis3.pdf> (4 pages).*

Sandvine, An Overview of the DOCSIS (Cable Internet) Platform, [online] Jan. 14, 2010, [retrieved from the Internet] <http://www.tiaonline.org/gov_affairs/fcc_filings/documents/Cable_Architecture_Declaration_01.14.10.pdf> (29 pages).*

Motorola, Expanding Bandwidth Using Advanced Spectrum Manafement, [Online] Sep. 25, 2003, [retrieved from the Internet] <http://www.motorola.com/web/Business/Solutions/Industry%20Solutions/Service%20Providers/Cable%20Operators/CablePON.pdf> (12 pages).*

* cited by examiner

DECOUPLING SOFTWARE LOADS FOR CUSTOMER PREMISE EQUIPMENT

TECHNICAL FIELD

This disclosure relates to provision of software updates.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

Subscribers typically have multiple customer premise equipment (CPE) devices at their location to provide such varied services. Each of these devices carries a software load installed by the manufacturer. However, occasionally the software load is updated. The software load can be updated by the manufacturer or MSO using an enhanced firmware loading (EFL) feature. Such loads are typically certified by Cable Television Laboratories, Inc. of Louisville, Colo. However, this certification process can be time consuming and inhibits release of software upgrades.

BRIEF DESCRIPTION OF THE DRAWINGS

Like reference numbers and designations in the various drawings indicate like elements.

DETAILED DESCRIPTION

In some implementations of this disclosure, systems and methods can operate to decouple software loads for CPE devices. Decoupling the software load for CPE devices can facilitate updating software on CPE devices without requiring recertification. For example, a typical software load for a CPE device can include both a device load and a component load. In some examples, the device load may be governed by a certification authority (e.g., including Cable Television Laboratories, Inc. (CableLabs), of Louisville, Colo.). Such loads may be required to be certified by these certification authorities. Thus, separating the loads can facilitate updating any component loads (e.g., a daughter card load) without requiring recertification. In some implementations, such loads can be decoupled through the use of an enhanced firmware loading (EFL) mechanism specifying a separate load for the device and components of the device. For example, the device and component loads can be decoupled through the creation of a separate management information base (MIB) object for a specified module. Thus, a command can be sent from an administrative server via an SNMP message identifying the module and a current load for that module. In other examples, the device can identify a new load based upon a configuration file downloaded during the registration process with the network.

Figure 1:
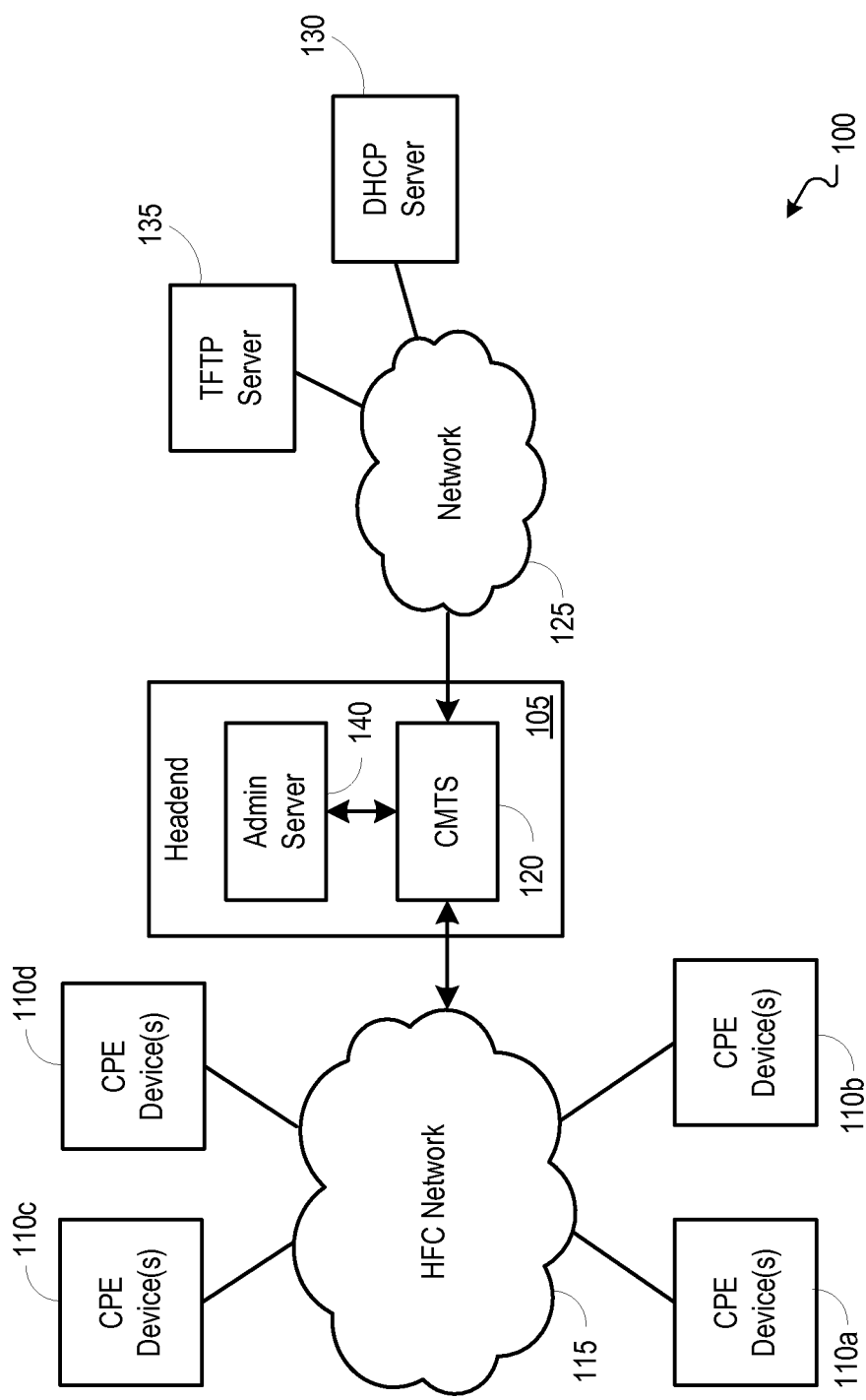
FIG. 1 is a block diagram illustrating an exemplary network environment operable to provide decoupled software loads for CPE devices.

FIG. 1 is a block diagram illustrating an exemplary network environment operable to provide decoupled software loads for CPE devices. In some implementations, a headend 105 can provide video, data and/or voice service(s) to customer premise equipment (CPE) devices 110a-d in one or more subscriber groups (e.g., service group(s)) through a hybrid fiber-coax (HFC) network 115. The headend 105 can include devices such as a cable modem termination system (CMTS) 120 and/or an edge quadrature amplitude modulation (EQAM) device, or a combined device including multiple edge and/or video or data processing functionalities. Such devices can operate to facilitate communications between a network 125 and the CPE device 110a-d. In various implementations, the network 125 can include one or more networks internal to the headend and/or one or more networks external to the headend (e.g., one or more extranets, the Internet, etc.).

Data services can be handled by the headend 105 through a CMTS 120. The CMTS 120 can receive data signals from external device(s) or nodes through network(s) 125. The network(s) 125, for example, can operate using Internet protocol (IP), sending data packets to and receiving data packets from the headend 105. In some examples, the CMTS 120 can be paired with a SIP proxy server (not shown) operable to provide voice over internet protocol (VoIP) services with voice connectivity to other subscribers or voice connectivity to a public switched telephone network (PSTN) (not shown). In still further examples, one or more video sources may provide streaming data through the network(s) 125 to the CMTS 120

In some implementations, the CMTS 120 can forward packets destined for subscribers to an EQAM device used to modulate the signal onto a carrier waveform. The carrier waveform can include both data and video streams, in both multicast and unicast (e.g., point-to-point) formats for transmission to a combiner, which can combine multiple signals onto a single fiber for transmission to one or more CPE devices 110a-d via the hybrid fiber-coax (HFC) network 115. In other implementations, the CMTS 120 can modulate a baseband signal to a carrier wave and transmit the signal to a combiner for upconversion to a transmission frequency.

When a CPE device 110a-d initially attempts to connect to the headend 105, the device 110a-d goes through a registration process with the headend 105. The registration process typically includes retrieval of a configuration filename from a dynamic host control protocol (DHCP) server 130 through the network 125. Upon receipt of the configuration filename, the CPE device 110a-d identifies a trivial file transfer protocol (TFTP) server 135 where the configuration file is stored. The CPE device 110a-d then requests the configuration file from the TFTP server 135 using the filename provided by the DHCP server. Upon receiving the configuration file, the CPE device 110a-d registers with the CMTS 120.

In some instances, after a CPE device 110a-d has been deployed (e.g., distributed to a customer), the manufacturer of the device 110a-d or an MSO associated with the device 110a-d would like to modify the software (e.g., load) on the device. For example, the manufacturer might have located a bug in the software and desire to correct the bug through a software update. Prior art mechanisms for applying such updates included updating the entire load for the device 110a-d. Such mechanisms, however, involved obtaining approval from a standards body before being able to distribute the update, even if the update did not affect the software governed by the standards body.

In some implementations, the software load on the CPE device 110a-d can be separated. Such separation of the software load into multiple pieces can facilitate updating an embedded service application/functional entity (eSAFE) load without affecting a device load. The device load can be identified as a software load governed by a standards body. Thus, updating an eSAFE load does not involve approval from the standards body.

In some implementations, the eSAFE load can be updated via the configuration file. Thus, when a CPE device 110a-d (e.g., such as a cable modem) is powered on after being off or connected to the network after being disconnected from the network, a configuration file is obtained based upon the procedure outlined above. In those implementations where the configuration file is used to notify CPE devices 110a-d of software updates, the configuration file can include an EFL notification identifying a new eSAFE software load. The CPE device 110a-d can compare the eSAFE software load identified in the configuration file to a current version of the eSAFE software load stored in non-volatile memory (e.g., a data store). For example, comparing the version of the eSAFE software load identified by the configuration file to a current version of the eSAFE software load can include comparing the filenames of the respective loads.

If the version does not correspond to the current version of the eSAFE software load, the CPE device can retrieve the new version of the eSAFE software load. In some implementations, the eSAFE software load identified by the configuration file is only retrieved if it is a more recent version than the current eSAFE load. The eSAFE load identified by the configuration file can be retrieved, for example, from a TFTP server.

In some implementations, eSAFE software upgrades can also (or alternatively) be pushed to devices using an administrative server 140 operable to use a simple network management protocol (SNMP). The administrative server 140 can send a message including software update instructions to CPE devices 110a-d. The SNMP message can identify a particular management information base (MIB) object type associated with the software update. The MIB can be used to identify the type of eSAFE device(s) affected by the software update. The message sent by the administrative server to the devices 110a-d connected to the network 115 can also include identification of the load version to be used by the devices 110a-d. It should be understood that although the administrative server is shown residing at the headend, that the administrative server can reside on the network in various implementations. For example, the manufacturer can push updates to the device using SNMP messages transmitted across the network 125, CMTS 120, and HFC network 115 to the device(s) 110a-d.

In some implementations, devices 110a-d receiving the SNMP message from the administrative server 140 can check to see whether the MIB identified in the message received from the administrative server 140 corresponds to a module included in the device 110a-d. If the device 110a-d includes a module corresponding to the MIB object identified within the message, the device can then compare the software load identified by the message to a current software load being used by the module corresponding to the MIB object identified within the message. For example, the device can compare the name of the software load from the message to the name of the current load being used by the module identified by the MIB object identifier. If the names of the software loads differ, the device 110a-d can update the software load. In some implementations, the software can be updated when the version in the message is a more recent version than the version currently being used by the module identified by the MIB object identifier. In other implementations, the CPE device 110a-d may revert to a previous version of the software load, if the message received from the administrative server 140 includes the name of a previous load. Such an implementation might be useful if an administrator would like to revert to a previous version of the software load.

Figure 2:
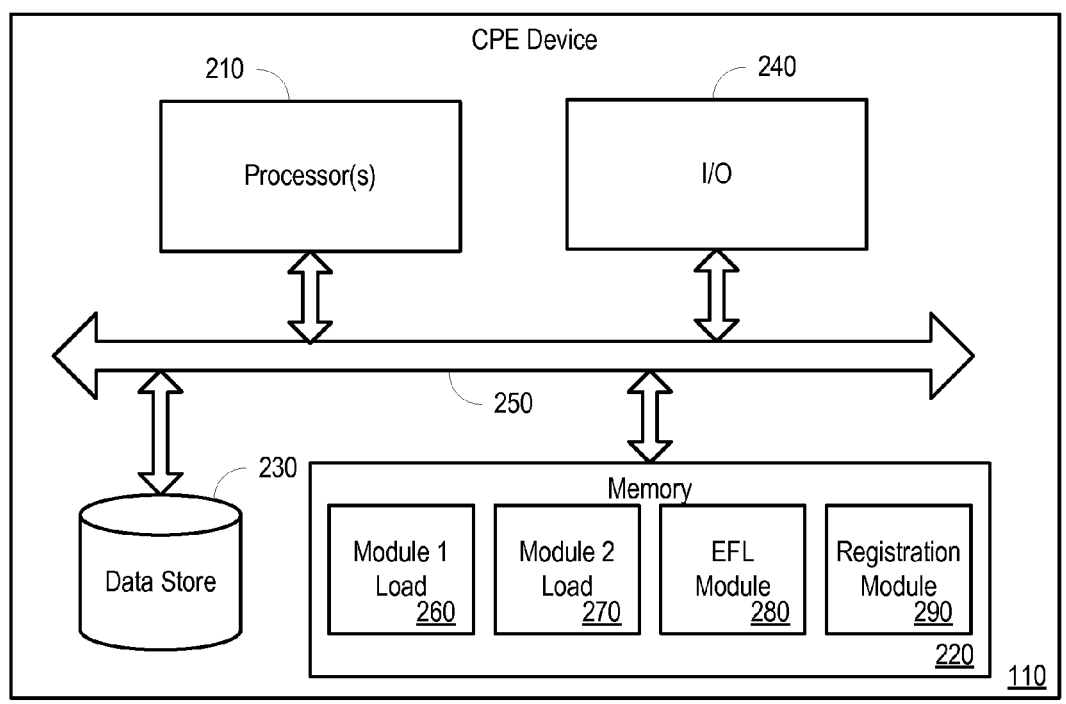
FIG. 2 is a block diagram illustrating a CPE device operable to use EFL to retrieve decoupled software loads.

FIG. 2 is a block diagram illustrating a CPE device 110 operable to use a configuration file or an administrative server software update message to retrieve decoupled software loads. The CPE device 110 can include a processor 210, a memory 220, a storage device 230, and an input/output device 240. Each of the components 210, 220, 230, and 240 can, for example, be interconnected using a system bus 250. The processor 210 is capable of processing instructions for execution within the CPE device 110. In one implementation, the processor 210 is a single-threaded processor. In another implementation, the processor 210 is a multi-threaded processor. The processor 210 is capable of processing instructions stored in the memory 220 or on the storage device 230.

The memory 220 stores information within the CPE device 110. In one implementation, the memory 220 is a computer-readable medium. In some implementations, the memory 220 can include a volatile memory unit. In some implementation, the memory 220 can include a non-volatile memory unit.

In some implementations, the storage device 230 is capable of providing mass storage for the CPE device 110. In one implementation, the storage device 230 is a computer-readable medium. In various different implementations, the storage device 230 can, for example, include a hard disk device, an optical disk device, flash memory or some other large capacity storage device.

The input/output device 240 provides input/output operations for the CPE device 110. In some implementations, the input/output device 240 can include one or more of a plain old telephone interface (e.g., an RJ11 connector), a network interface device, e.g., an Ethernet card, a serial communication device, e.g., an RS-232 port, an RF/coax interface, and/or a wireless interface device, e.g., an 802.11 card. In another implementation, the input/output device can include driver devices configured to receive input data and send output data to other input/output devices, such as one or more computers, as well as sending communications to, and receiving communications from a network. Other implementations, however, can also be used, such as mobile computing devices, mobile communication devices, set-top box television client devices, etc.

The CPE device (e.g., cable modem, set top box, media terminal adapter, etc.) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

In some implementations, the memory 220 can include a first module load 260, a second module load 270, an EFL module 280 and a registration module 290. The first module load can include, for example, the software load for the device 110. The software load for the device 110 can provide instructions for processing data in accordance with a standard (e.g., a DOCSIS standard).

The second module load 270 can include a software load for an eSAFE module. The second MIB object 270 can include instructions regarding how to handle peripherals associated with functionality of an eSAFE module (e.g., an 802.11 wireless functionality, set top box functionality, etc.). It should be noted that in some implementations, the second module is installed as a separate component (e.g., a subsystem, daughter card, etc.) within the device and uses a different processor than that used by other components of the device 110. In such implementations, the processor 210 associated with the device can communicate with the second module through a bus or other interconnection mechanism. In some implementations, the second module may also be associated with its own processor, memory, data store and/or I/O interfaces.

The EFL module 280 can operate to manage the updating of software loads on the CPE device 110. In some implementations, the EFL module 280 can receive SNMP software update messages from an administrative server and inspect the software update messages to determine whether any of the software loads associated with the device 110 is affected by the software update message. The EFL module 280 can determine whether a MIB object identified by the software update message corresponds to the first or second modules included in the device 110. If a MIB object identified by the software update message corresponds to the first or second modules included in the device 110, the EFL module can compare a software load identified by the software update message to a current load being used by the module that corresponds to the MIB object identifier. If the loads are the same, the EFL ignores the software update message. However, if the load version identified by the software update message differs from the current software load being used by the module identified by the MIB object identifier, the load version identified by the software update message can be retrieved and can replace the load used by the module load 260, 270 corresponding to the MIB object identifier.

The registration module 290 can operate to register the device 110 with a headend. During the registration process, the registration module 290 can receive a configuration file operable to identify configuration of the CPE device 110. In some implementations, the configuration file can include a software update message. The software update message can identify software to be used on the device. The software loads (e.g., the first module load 260, second module load 270) currently being used by the device can be compared to the software loads identified by the software update message. In some implementations, if the current software load differs from the respective load identified by the software update message, the new software load can be retrieved and installed in place of the respective software load 260, 270. In other implementations, the new software load identified in the software update message is only retrieved and installed if it is a newer version than the respective current software load.

Figure 3:
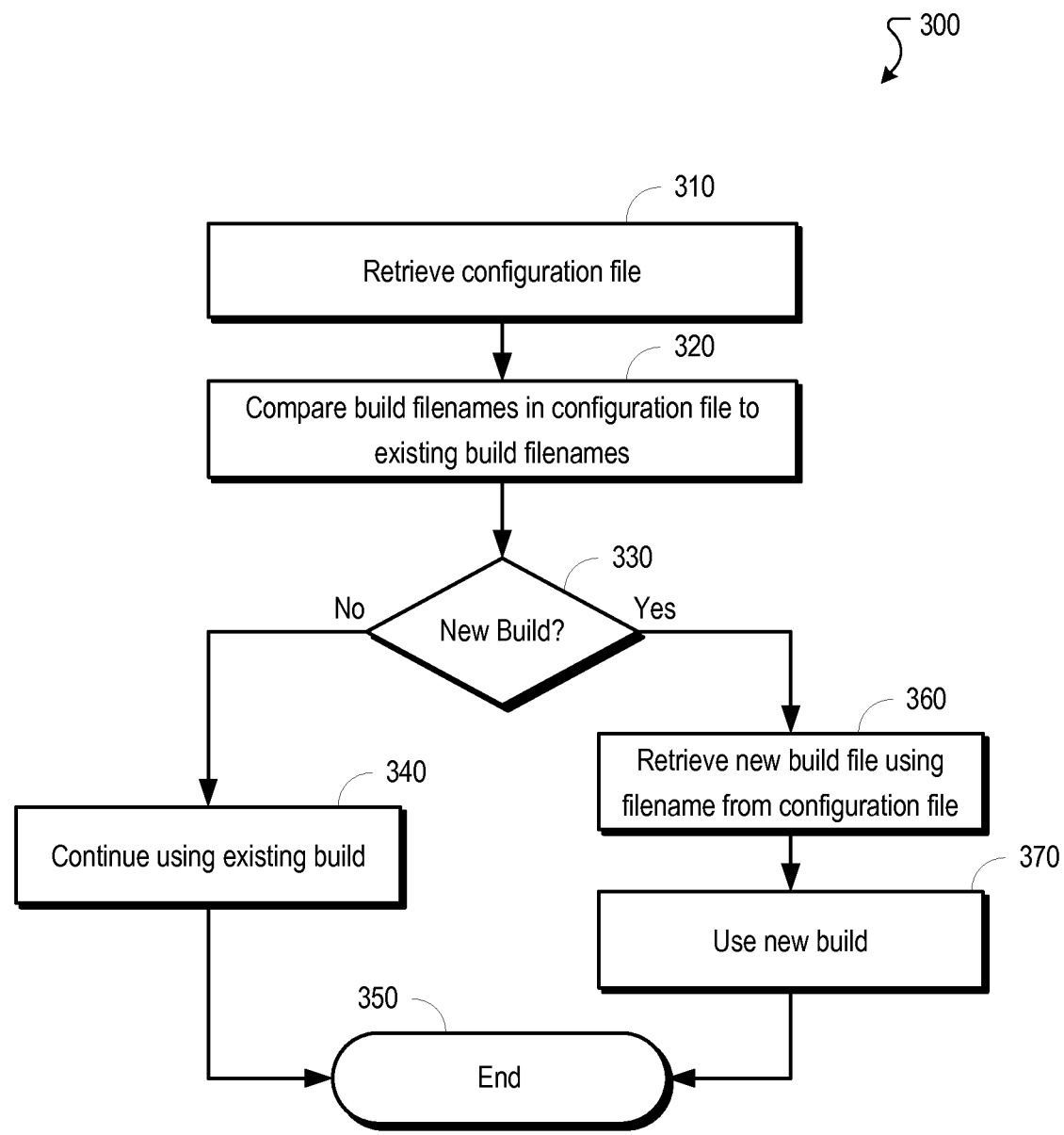
FIG. 3 is a flowchart illustrating an example process for retrieving decoupled software loads for CPE devices.

FIG. 3 is a flowchart illustrating an example process 300 for retrieving decoupled software loads for CPE devices. At stage 310 a configuration file is retrieved. The configuration file can be retrieved, for example, by a registration module (e.g., registration module 290 of FIG. 2). The configuration file can include a software update notification. In some implementations, the software update notification can identify a module load to be updated. In such implementations, if the module load identified by the MIB object is included in the device, then the device can determine whether the current software should be updated based upon the software update notification. In other implementations, the software update notification can identify each of the loads on the device based upon the filename associated with the load.

At stage 320, load filenames in the configuration file can be compared to existing load filenames. The load filenames in the configuration file can be compared to existing load filenames, for example, by an EFL module (e.g., EFL module 280 of FIG. 2). In some implementations, the filenames can be given standardized names to facilitate comparison of the filenames.

If the existing load filenames correspond to the filenames in the configuration file as shown at stage 330, the process 300 can continue at stage 340. At stage 340, the existing configuration file continues to be used. The existing configuration file can be continued to be used, e.g., by a memory (e.g., memory 220 of FIG. 2) in conjunction with a processor (e.g., processor 210 of FIG. 2). The process 300 ends at stage 350.

Returning to stage 330, if the filenames do not correspond at stage 330, the process 300 can continue to stage 360. At stage 360, a new load file is retrieved. The new load file can be retrieved, for example, by a retrieval module (e.g., EFL module 280 of FIG. 2). The new load file can be retrieved based upon the filename included in the configuration file. After retrieving the new load file, the device can use the new load file at stage 370. The new load file can be used, for example, by the memory (e.g., memory 220 of FIG. 2) in conjunction with a processor (e.g., processor 210 of FIG. 2). The process ends at stage 350.

Figure 4:
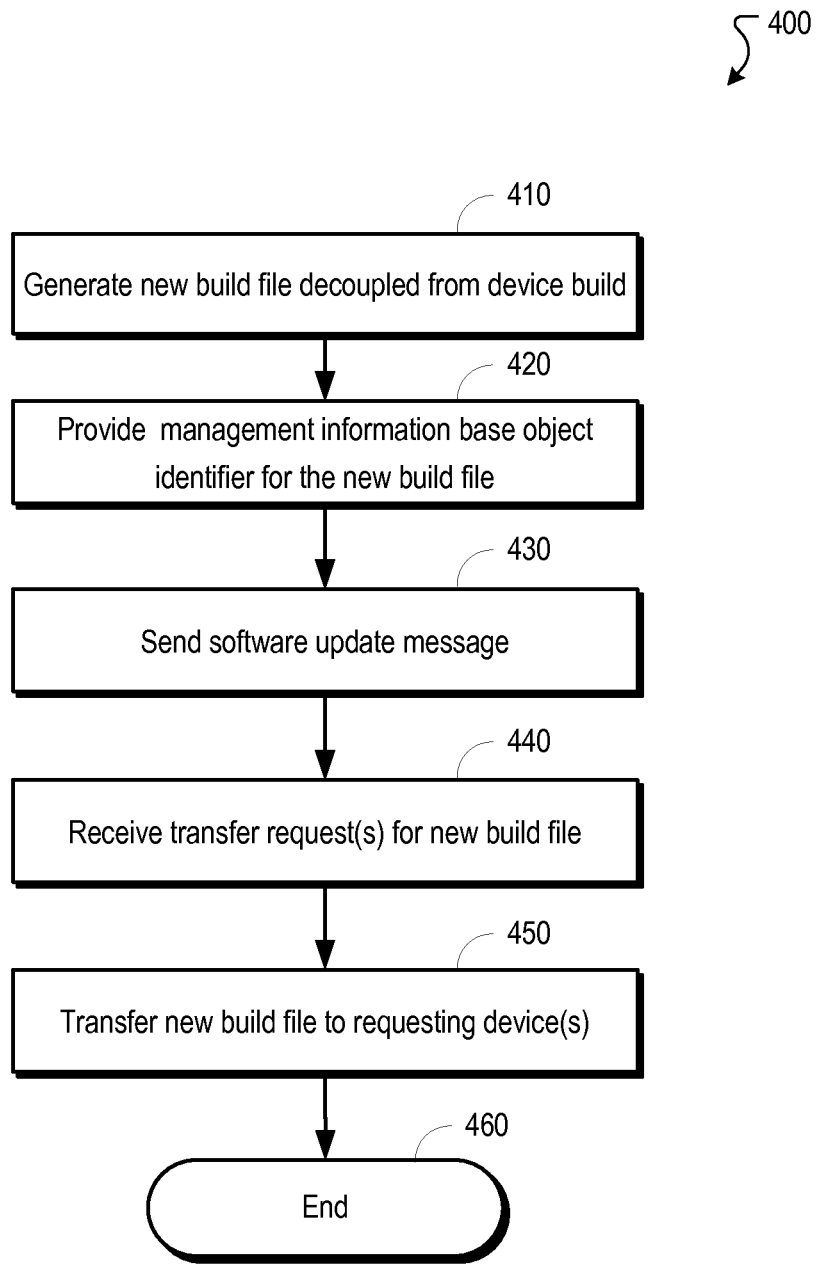
FIG. 4 is a flowchart illustrating an example process for providing decoupled software loads to CPE devices.

FIG. 4 is a flowchart illustrating an example process 400 for providing decoupled software loads to CPE devices. At stage 410, an eSAFE load file is generated that is decoupled from a device load. The eSAFE load can be generated, for example, by a computer or administrator (e.g., administrative server 140 of FIG. 1).

At stage 420, a MIB object identifier for the new load file is provided. The MIB object identifier can be provided, for example, by a computer and/or administrator (e.g., an administrative server 140 of FIG. 1). In some implementations, the MIB object can identify a class of devices or subcomponents of devices. In one example, a MIB object might identify a set top box load. In other examples, a MIB object might identify a media terminal adapter, a cable modem or a telephony modem.

At stage 430, a software update message is sent. The software update message can be sent, for example, by an administrative server (e.g., administrative server 140 of FIG. 1). In some implementations, the software update message can include a MIB object identifier, identifying the component(s) or module(s) of a device that may have updated software loads. The software update message can further include the name of the software load, such that the device can compare the name of an existing software load with the name of the software load included in the software update message to determine whether to update its software load.

At stage 440, a transfer request for the new load file is received. The transfer request for the new load file can be received, for example, by a TFTP server (e.g., TFTP server 135 of FIG. 1). At stage 450, the new load file is transferred to the device. The new load can be transferred to the device, for example, by a TFTP server (e.g., TFTP server 135 of FIG. 1). In some implementations, the load file can be transferred to the device using file transfer protocol (FTP) messages. At stage 460, the process 400 ends.

Figure 5:
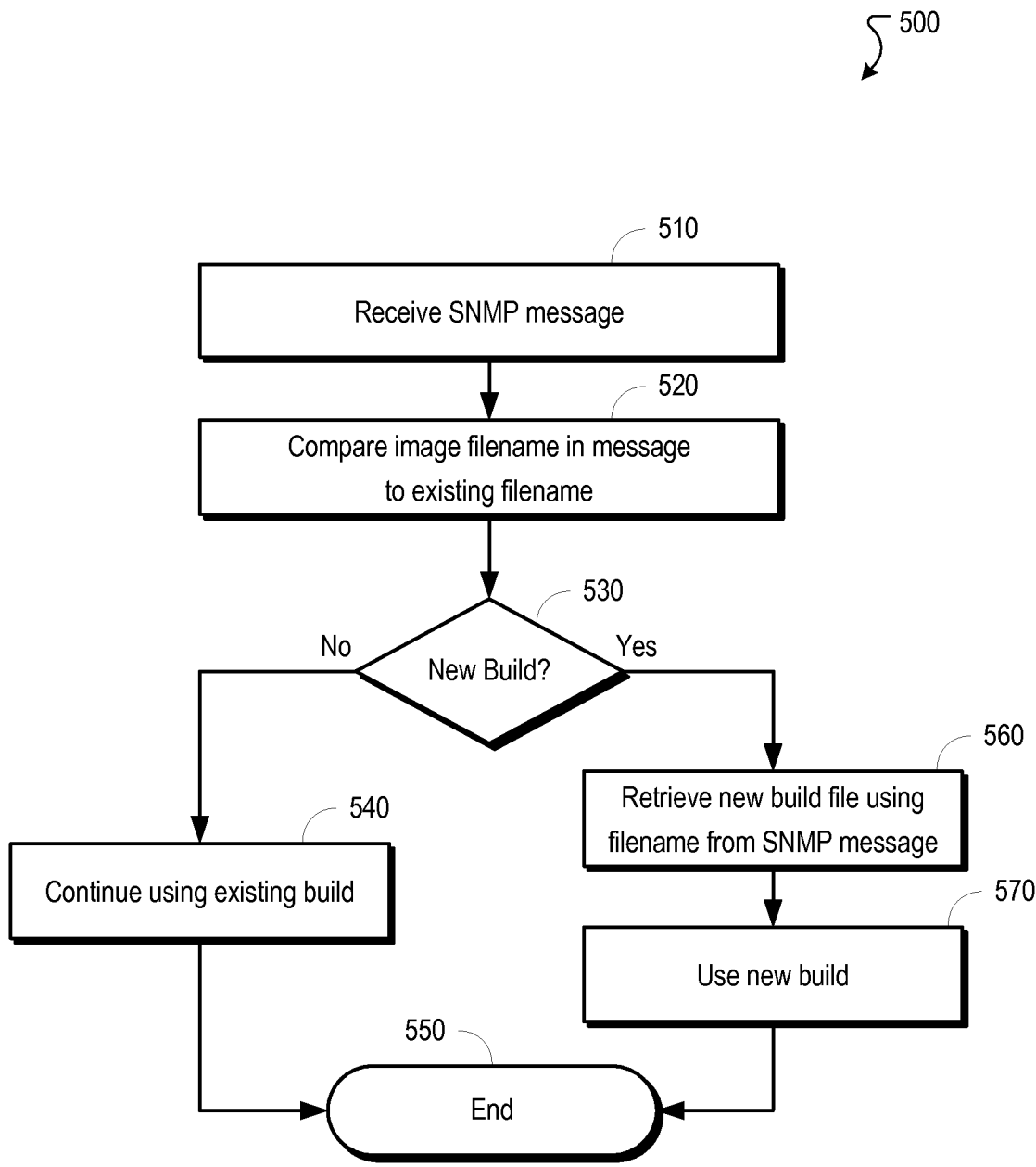
FIG. 5 is a flowchart illustrating another example process for retrieving decoupled software loads for CPE devices.

FIG. 5 is a flowchart illustrating another example process 500 for retrieving decoupled software loads for CPE devices. The process 500 begins at stage 510, where an SNMP message is received. The SNMP message can be received for example, by an EFL module (e.g., EFL module 280 of FIG. 2)

via an I/O interface (e.g., I/O interface 240 of FIG. 2). In some implementations, the SNMP message includes a software update notification. The software update notification can include a MIB object identifier and an updated software filename.

At stage 520, load filenames in the SNMP message can be compared to existing load filenames. The load filenames in the configuration file can be compared to existing load filenames, for example, by an EFL module (e.g., EFL module 280 of FIG. 2). In some implementations, the filenames can be given standardized names to facilitate comparison of the filenames.

At stage 530, it is determined whether the load associated with the SNMP message is a new load. The determination of whether the load associated with the SNMP message is a new load can be provided, for example, by an EFL module (e.g., EFL module 280 of FIG. 2). In some implementations, the determination of whether the load is new can be based upon whether a load filename included in the SNMP message corresponds to an existing load filename. In other implementations, the determination of whether the load is new can be based upon whether a load filename included in the SNMP message is a newer version of an existing load filename.

If it is determined that the load is not a new load, as shown at stage 530, the process 500 can continue at stage 540. At stage 540, the existing load continues to be used. The existing load can be continued to be used, e.g., by a memory (e.g., memory 220 of FIG. 2) in conjunction with a processor (e.g., processor 210 of FIG. 2). The process 500 ends at stage 550.

Returning to stage 530, if the filenames do not correspond at stage 530, the process 500 can continue to stage 560. At stage 560, a new load file is retrieved. The new load file can be retrieved, for example, by a retrieval module (e.g., EFL module 280 of FIG. 2). The new load file can be retrieved based upon the filename included in the SNMP message. After retrieving the new load file, the device can use the new load file at stage 570. The new load file can be used, for example, by the memory (e.g., memory 220 of FIG. 2) in conjunction with a processor (e.g., processor 210 of FIG. 2). The process 500 ends at stage 550.

The cable modems and CMTSs of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a digital signal processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method for updating software comprising:
   retrieving a configuration file for data over cable service interface specification (DOCSIS) based device, the configuration file comprising a software update message, wherein the software update message comprises information identifying a first software load for a non-DOCSIS module, and wherein the DOCSIS based device comprises both the non-DOCSIS module and a DOCSIS module, each requiring firmware loads for the DOCSIS based device to operate;
   comparing the information identifying the first software load for the non-DOCSIS module to information identifying a second software load for the non-DOCSIS module, wherein
   the first software load is a new software load, and the second software load is an existing software load; and
   updating the second software load by retrieving the first software load and replacing the second software load with the first software load without modifying an existing firmware load for the DOCSIS module.

2. The method of claim 1, wherein the information identifying the first software load and the information identifying the second software load comprises filenames.

3. The method of claim 2, wherein the identifying information of the second file load comprises a filename identified from a management information base (MIB) object identifier.

4. The method of claim 1, wherein the first software load and the second software load comprises an embedded service application/functional entity (eSAFE) load.

5. The method of claim 1, wherein second software load is decoupled from a third software load, the third software load comprising software that meets a certification.

6. The method of claim 5, wherein the certification comprises compliance with a standard.

7. The method of claim 6, wherein the standard comprises DOCSIS.

8. The method of claim 1, wherein the information identifying the first software load comprises an enhanced firmware loading (EFL) notification identifying an embedded service application/functional entity (eSAFE) software load.

9. The method of claim 1, wherein retrieving a configuration file is performed as part of a registration process with a headend device.

10. The method of claim 9, wherein the headend device comprises a dynamic host control protocol (DHCP) server.

11. The method of claim 1, wherein, prior to updating the second software load, using the information identifying the first software load and the information identifying the second software load to determine if the first software load and the second software load correspond.

12. A computer-implemented method for providing decoupled software loads comprising:
   sending a message comprising an object identifier for a data over cable service interface specification (DOCSIS) device, and the message further comprising information identifying a non-DOCSIS software load and a DOCSIS software load, wherein the object identifier identifies the modules of the DOCSIS based device that can execute the software loads, and wherein the non-DOCSIS software load is decoupled from the DOCSIS software load existing on the device;
   receiving a request for the non-DOCSIS software load for the DOCSIS based device; and
   sending only the non-DOCSIS software load to the DOCSIS based device.

13. The method of claim 12, wherein the identifying information comprises a filename.

14. The method of claim 12, wherein the non-DOCSIS software load is received from a trivial file transfer protocol (TFTP) server.

15. The method of claim 12, wherein the non-DOCSIS software load comprises an embedded service application/functional entity (eSAFE) load.

16. The method of claim 12, wherein the DOCSIS software load comprises software that meets a DOCSIS standard certification.

17. A computer-implemented method for updating software comprising:
   receiving a message from a data over cable service interface specification (DOCSIS) based device comprising a DOCSIS module and a non-DOCSIS module, the message comprising information identifying a first software load for the non-DOCSIS module; comparing the information identifying the first software load for the non-DOCSIS module to information identifying a second software load for the non-DOCSIS module, wherein the first software load is a new software load, and the second software load is an existing software load;

updating the second software load by retrieving the first software load and replacing the second software load with the first software load; and maintaining a third load for the DOCSIS module as unchanged.

18. The method of claim 17, wherein the message comprises an simple network management protocol (SNMP) message.

19. The method of claim 17, wherein the method facilitates avoiding a recertification process for DOCSIS devices by maintaining the third load for the DOCSIS module unchanged.

* * * * *